(12) United States Patent
Wilcox

(10) Patent No.: US 8,375,984 B2
(45) Date of Patent: Feb. 19, 2013

(54) MULTIPLE PRESET INDEXING PRESSURE RELIEF VALVE

(75) Inventor: Robert B. Wilcox, Woodstock, NY (US)

(73) Assignee: Alcoa Inc., Pittsburgh, PA (US)

( * ) Notice: Subject to any disclaimer, the term of this patent is extended or adjusted under 35 U.S.C. 154(b) by 486 days.

(21) Appl. No.: 12/764,491

(22) Filed: Apr. 21, 2010

(65) Prior Publication Data

US 2010/0276014 A1 Nov. 4, 2010

Related U.S. Application Data

(60) Provisional application No. 61/214,545, filed on Apr. 24, 2009.

(51) Int. Cl.
*F16K 17/06* (2006.01)
(52) U.S. Cl. ......... 137/529; 137/524; 137/540; 251/337
(58) Field of Classification Search .................. 137/511, 137/529, 540, 524, 538, 542; 251/336, 337
See application file for complete search history.

(56) References Cited

U.S. PATENT DOCUMENTS

| | | | | |
|---|---|---|---|---|
| 4,958,548 A | * | 9/1990 | Schulze | 91/420 |
| 5,752,546 A | * | 5/1998 | Yamashita | 137/540 |
| 6,923,202 B2 | * | 8/2005 | Enerson | 137/271 |

FOREIGN PATENT DOCUMENTS

| | | |
|---|---|---|
| DE | 10257529 B3 | 8/2004 |
| GB | 2 233 428 A | 1/1991 |

OTHER PUBLICATIONS

International Search Report and Written Opinion issued in connection with Applicants' related International Patent Application No. PCT/US2010/031892 entitled "Multiple Preset Indexing Pressure Relief Valve" (9 pages), Aug. 12, 2010.

* cited by examiner

*Primary Examiner* — Stephen M Hepperle
*Assistant Examiner* — Daniel Edelbrock
(74) *Attorney, Agent, or Firm* — Greenberg Traurig, LLP

(57) ABSTRACT

A pressure relief valve having a plurality of selectable, preset relief pressure settings for use in connection with hydraulic equipment. The pressure relief valve includes a manifold and a barrel fastened to the manifold. The manifold includes a chamber that houses a relief valve cartridge assembly, which includes a poppet valve. The barrel includes, a plurality of chambers, each of which houses a separate and distinct relief pressure load adjustment assembly, which includes a spring-loaded ball that engages the poppet valve. Each of the assemblies may be independently adjusted and preset to a desirable relief pressure load setting, which may be different from one another. The barrel is rotated relative to the manifold until the chamber housing the assembly that has the desired preset relief pressure load aligns with the chamber of the manifold, and, in turn, with the poppet valve.

20 Claims, 7 Drawing Sheets

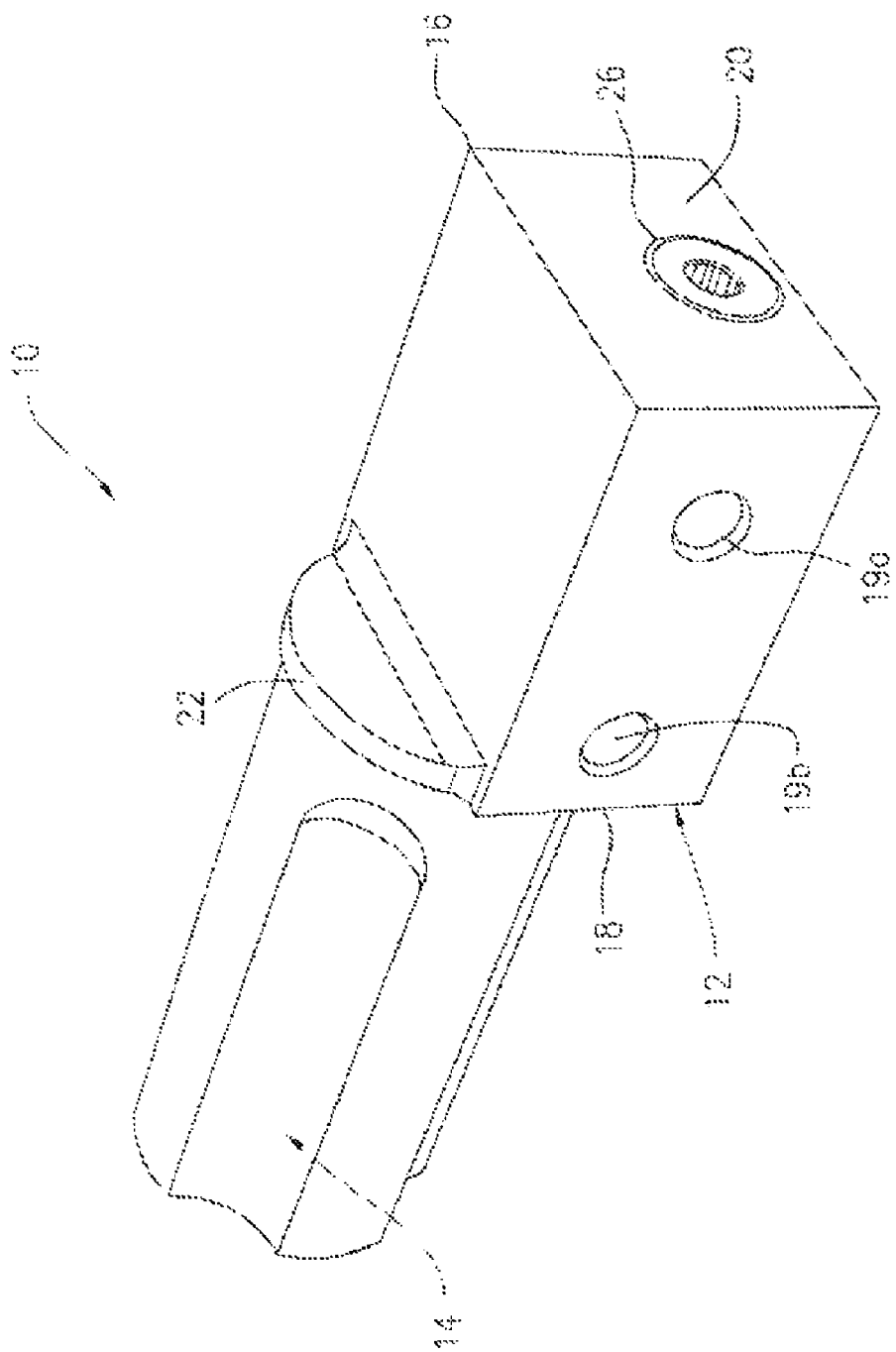

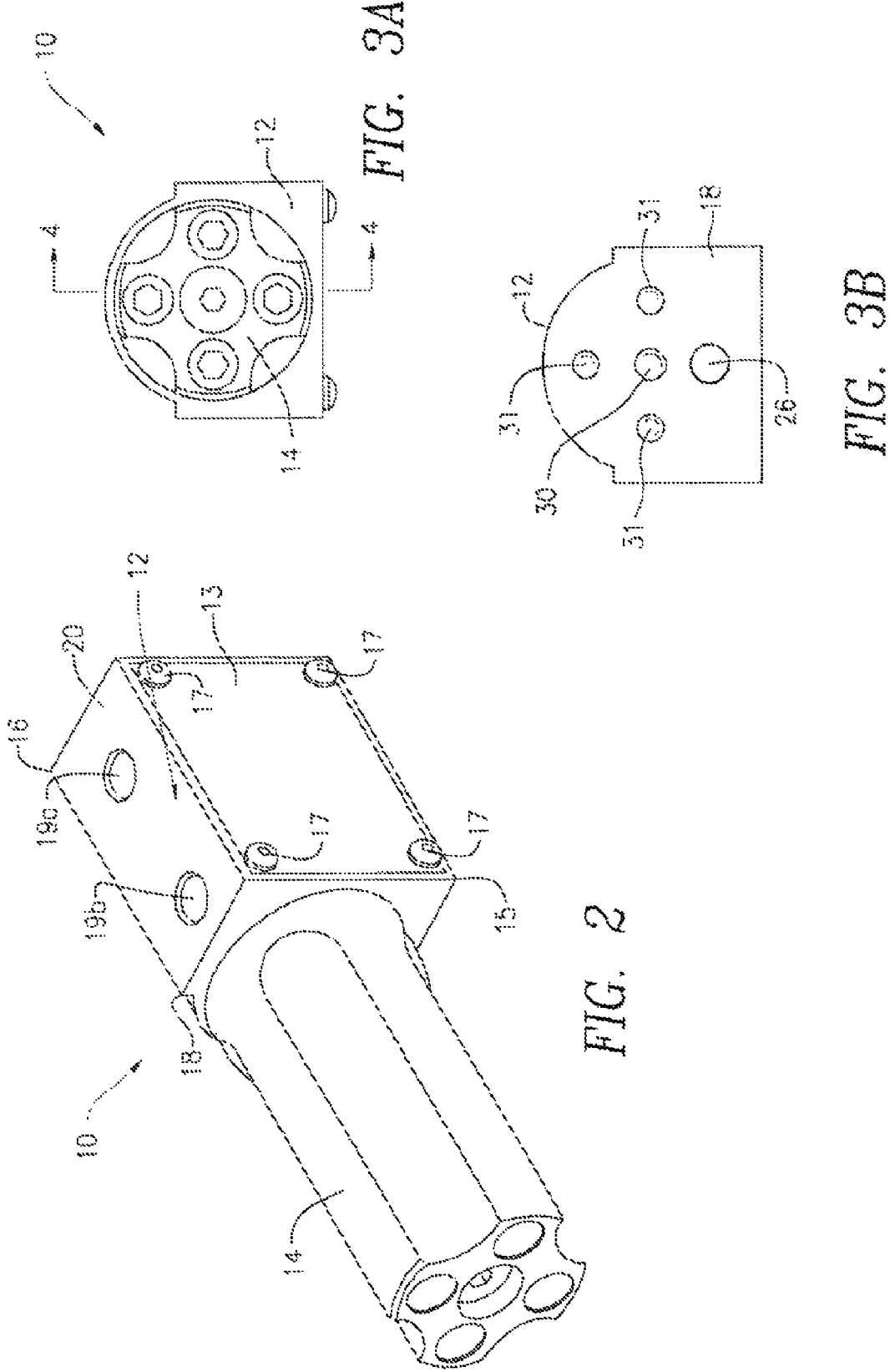

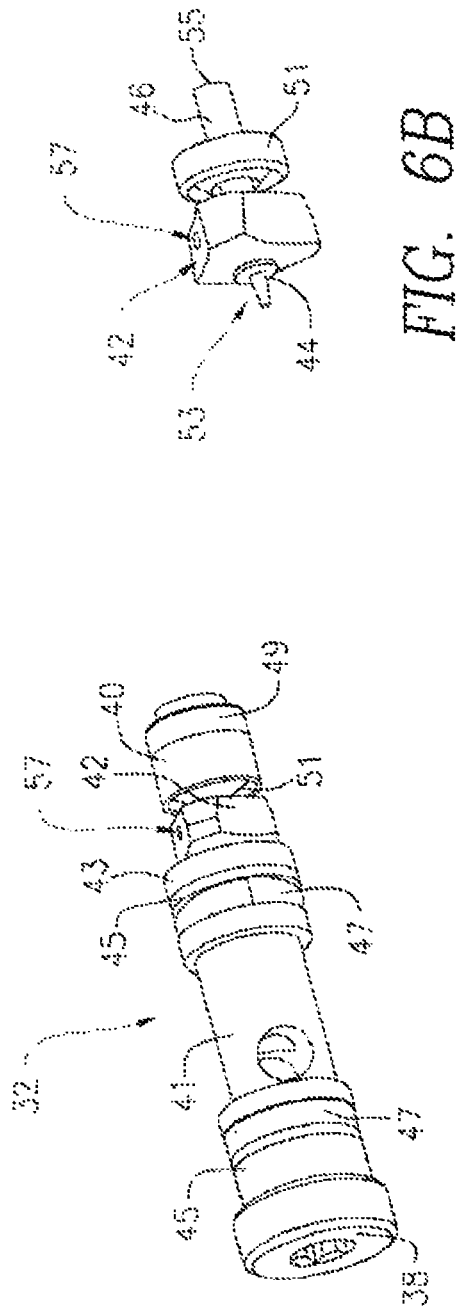
FIG. 6A
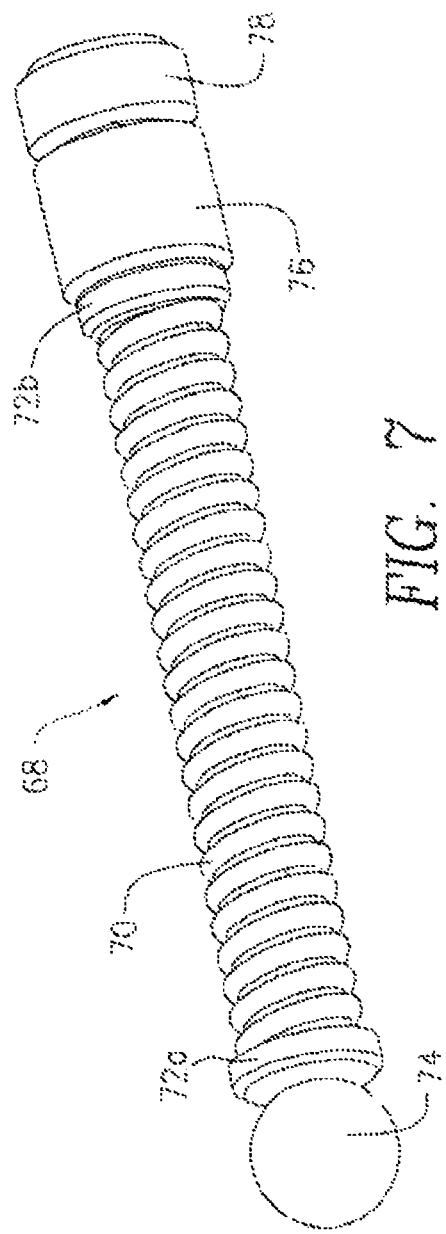
FIG. 6B
FIG. 7

MULTIPLE PRESET INDEXING PRESSURE RELIEF VALVE

CROSS-REFERENCE TO RELATED APPLICATION

This application is a Section 111(a) application relating to commonly owned, co-pending U.S. Provisional Application Ser. No. 61/214,545 entitled "MULTIPLE PRESET INDEXING PRESSURE RELIEF VALVE," filed Apr. 24, 2009, the entirety of which is incorporated herein by reference.

FIELD OF THE INVENTION

The present invention relates to a pressure relief valve for hydraulic applications and, more particularly, to a pressure relief valve having a plurality of selectable, preset relief pressure settings.

BACKGROUND OF THE INVENTION

In many applications, there is a need to change operating pressures when using hydraulic equipment, tools, and accessories. What is needed is a selectable pressure relief valve that enables a user to select and change an operating pressure.

SUMMARY OF THE INVENTION

In an embodiment, a pressure relief valve having a plurality of selectable, preset relief pressure settings for use in connection with hydraulic equipment. In an embodiment, the pressure relief valve includes a manifold and a barrel fastened to the manifold. In an embodiment, the manifold includes a chamber that houses a relief valve cartridge assembly, which includes a poppet valve. In an embodiment, the barrel includes a plurality of chambers, each of which houses a separate and distinct relief pressure load adjustment assembly, which includes a spring-loaded ball that engages the poppet valve. In an embodiment, each of the assemblies may be independently adjusted and preset to a desirable relief pressure load setting, which may be different from one another, and thus, the barrel may include a plurality of relief pressure settings to choose from. In an embodiment, the barrel is rotated relative to the manifold until the chamber housing the assembly that has the desired preset relief pressure load aligns with the chamber of the manifold, and, in turn, with the poppet valve of the relief valve cartridge assembly. Accordingly, a user may select from multiple, preset relief pressures by indexing (i.e., rotating) the barrel.

Further features and advantages of the invention will appear more clearly on a reading of the detailed description of the embodiments of the invention, which are given below by way of example only with reference to the accompanying drawings.

BRIEF DESCRIPTION OF THE DRAWINGS

Reference is made to the following detailed description of the embodiments considered in conjunction with the accompanying drawings, in which:

FIG. 1 is a top perspective view of a pressure relief valve constructed in accordance with an embodiment of the present invention;

FIG. 2 is a bottom perspective view of the pressure relief valve shown in FIG. 1;

FIG. 3A is a rear elevational view of the pressure relief valve shown in FIG. 1;

FIG. 3B is a rear elevational view of a manifold employed by the pressure relief valve shown in FIG. 1;

FIG. 6A is a perspective view of a relief valve cartridge assembly employed by the pressure relief valve shown in FIGS. 1 through 5;

FIG. 6B is a perspective view of a poppet and its associated check and inner seal employed by the relief valve cartridge assembly shown in FIG. 6A;

FIG. 7 is a perspective view of a relief pressure adjustment assembly employed by the pressure relief valve shown in FIGS. 1 through 5;

DETAILED DESCRIPTION OF THE EXEMPLARY EMBODIMENT

Referring to FIGS. 1 through 3A, in an embodiment, a pressure relief valve 10 includes a box-shaped manifold 12 and a substantially cylindrical-shaped barrel 14 connected to the manifold 12. In an embodiment, the barrel 14 is rotatably fastened to the manifold 12. In an embodiment, the manifold 12 and the barrel 14 are made from metal, such as, for example, steel or a metal alloy, but they can be made from other suitable materials known in the art. In an embodiment, the manifold 12 is box-shaped. In other embodiments, the manifold 12 consists of different shapes and sizes, depending upon the application and equipment for which the pressure relief valve 10 will be used. In an embodiment, the barrel 14 is substantially cylindrical in shape. In other embodiments, the barrel 14 consists of different shapes and sizes (e.g., having a square, hexagonal, octagonal, etc. cross-section). The features and functions of the manifold 12 and the barrel 14 shall be described hereinafter.

Figure 5:
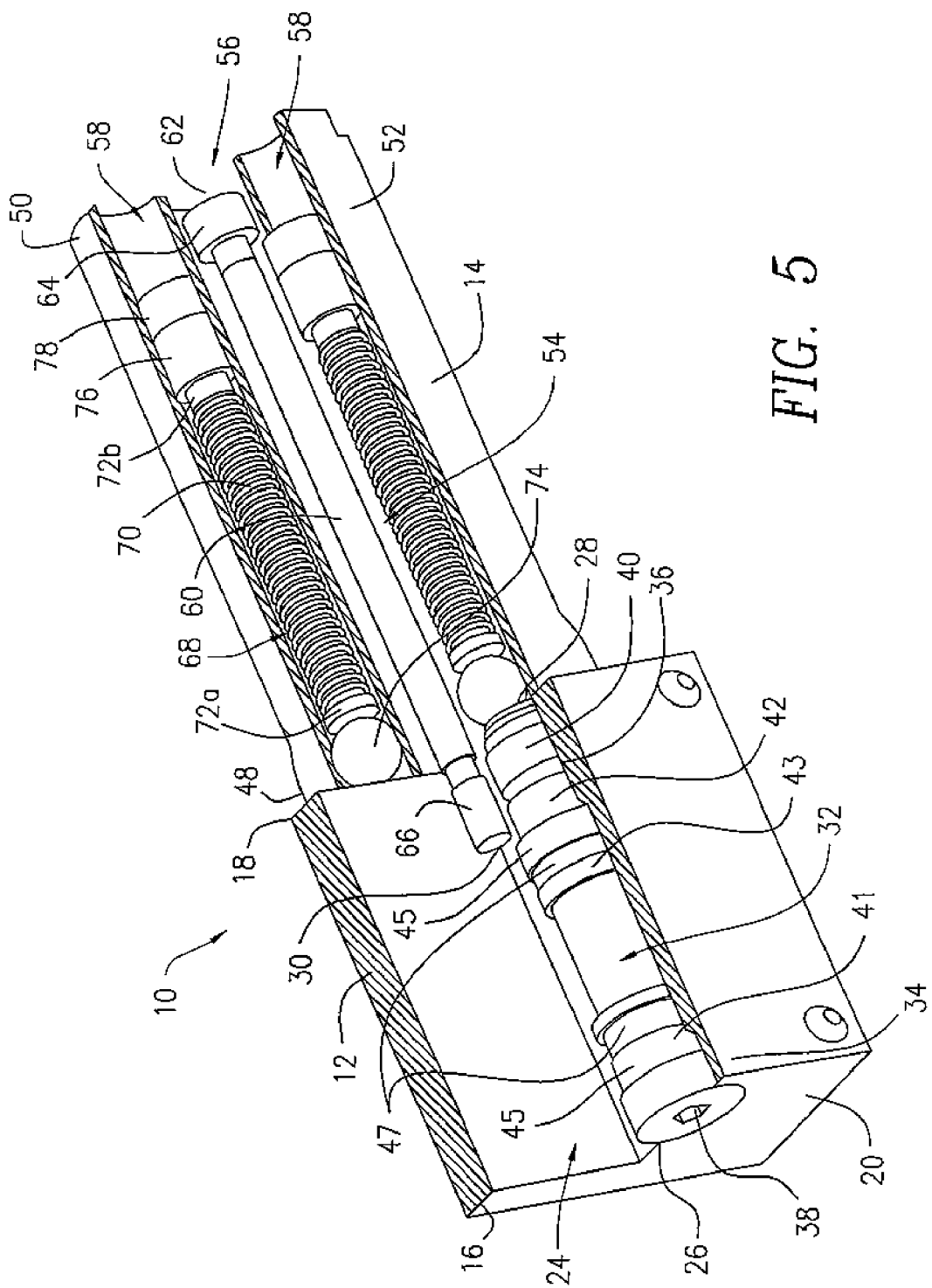
FIG. 5 is a top perspective view of the pressure relief valve shown in FIG. 1, with the manifold and a barrel employed by the pressure relief valve being shown in a partial cross-sectional view to reveal the internal components therein.

Referring to FIGS. 1, 2 and 5, in an embodiment, the manifold 12 includes a first end 16, a second end 18 opposite the first end 16, and an exterior surface 20. In an embodiment, a semi-circular-shaped end plate 22 extends outwardly from the second end 18 (see, specifically, FIG. 1), and its purpose shall be described hereinafter. With particular reference to FIG. 5, the manifold 12 includes an interior chamber 24 that extends from the first end 16 to the second end 18. The chamber 24 houses the internal components of the manifold 12, which will be described below. In an embodiment, the chamber 24 is flanked by a first orifice 26 positioned at the first end 16 and extending from the exterior surface 20 into the chamber 24 (see FIGS. 1 and 5), and a second orifice 28 positioned at the second end 18 and extending from the exterior surface 20 to the chamber 24 (see FIG. 5). In an embodiment, the manifold 12 includes a separate, second chamber 30 (see FIG. 5), whose purpose shall be described hereinafter. With particular reference to FIG. 2, in an embodiment, a rectangular-shaped marking plate 13 is attached to a bottom portion 15 of the manifold 12 by a plurality of fasteners 17. In an embodiment, the fasteners 17 may include screws or any other suitable fasteners. In an embodiment, the manifold 12 includes a removable cover that provides access to the interior chamber 24 and the internal components of the manifold 12 (not shown in the Figures). With reference to FIGS. 1 and 2, in an embodiment, the manifold 12 includes a plurality of inlet ports 19a each of which extends from the exterior surface 20 to the chamber 24, and a plurality of outlet ports 19b each of which extends from the exterior surface 20 to the chamber 24. In an embodiment, the manifold 12 includes two of the inlet ports 19a and two of the outlet ports 19b. In other embodiments, the manifold 12 may include more or less than two of the inlet ports 19a and two of the outlet ports 19b. The purposes and functions of the inlet and outlet ports 19a, 19b shall be described hereinafter.

With reference to FIG. 3B, in an embodiment, the manifold 12 includes a plurality of circular-shaped detents 31 formed within the exterior surface 20 at the first end 18 of the manifold 12 and surround the second chamber 30 at the first end 18. In an embodiment, the manifold 12 includes three of the detents 31. In other embodiments, the manifold 12 includes more or less than three of the detents 31. In other embodiments, the detents 31 consist of other shapes and sizes. The purpose and function of the detents 31 shall be described hereinafter.

Referring to FIGS. 4 through 6B, in an embodiment, a relief valve cartridge assembly 32 is housed within the chamber 24 and extends from a high pressure side 34 to a return (i.e., tank) side 36 of the manifold 12. In an embodiment, the relief valve cartridge assembly 32 has an end cap 38 positioned proximate to the first orifice 26 of the manifold 12, and a gland bushing 40 positioned proximate to the second orifice 28 of the manifold 12.

With particular reference to FIGS. 4, 5, 6A and 6B, in an embodiment, the relief valve cartridge assembly 32 further includes a plug 41 and a seat 43 juxtaposed and in fluid communication with the plug 41. In an embodiment, the plug 41 is secured in place by the end cap 38. In an embodiment, each of the plug 41 and the seat 43 includes a back-up ring 45 and an O-ring 47 for sealing purposes. In an embodiment, the relief valve cartridge assembly 32 further includes a poppet 42 having a poppet check 44 and a stem 46 received by the gland bushing 40 (see FIG. 6B). In an embodiment, the poppet check 44 includes a wide-angled cone 53 shape, whose purpose shall be described hereinafter. In an embodiment, the poppet 42 need not include the poppet check 44. In an embodiment, the poppet 42 includes a port hole 57 (see FIGS. 6A and 6B), whose purpose and function shall be described hereinafter. In an embodiment, the gland bushing 40 includes an O-ring 49 and an inner seal 51 for sealing purposes. In an embodiment, certain components of relief valve cartridge assembly 32 (e.g., the plug 41, the seat 43, the poppet 42, the end cap 38, and the gland bushing 40) are made from metal. In other embodiments, the foregoing components may be made from other suitable materials, such as, for example, a polymer plastic. The purpose and function of the relief valve cartridge assembly 32 and its associated components shall be described in further detail below.

Figure 4:
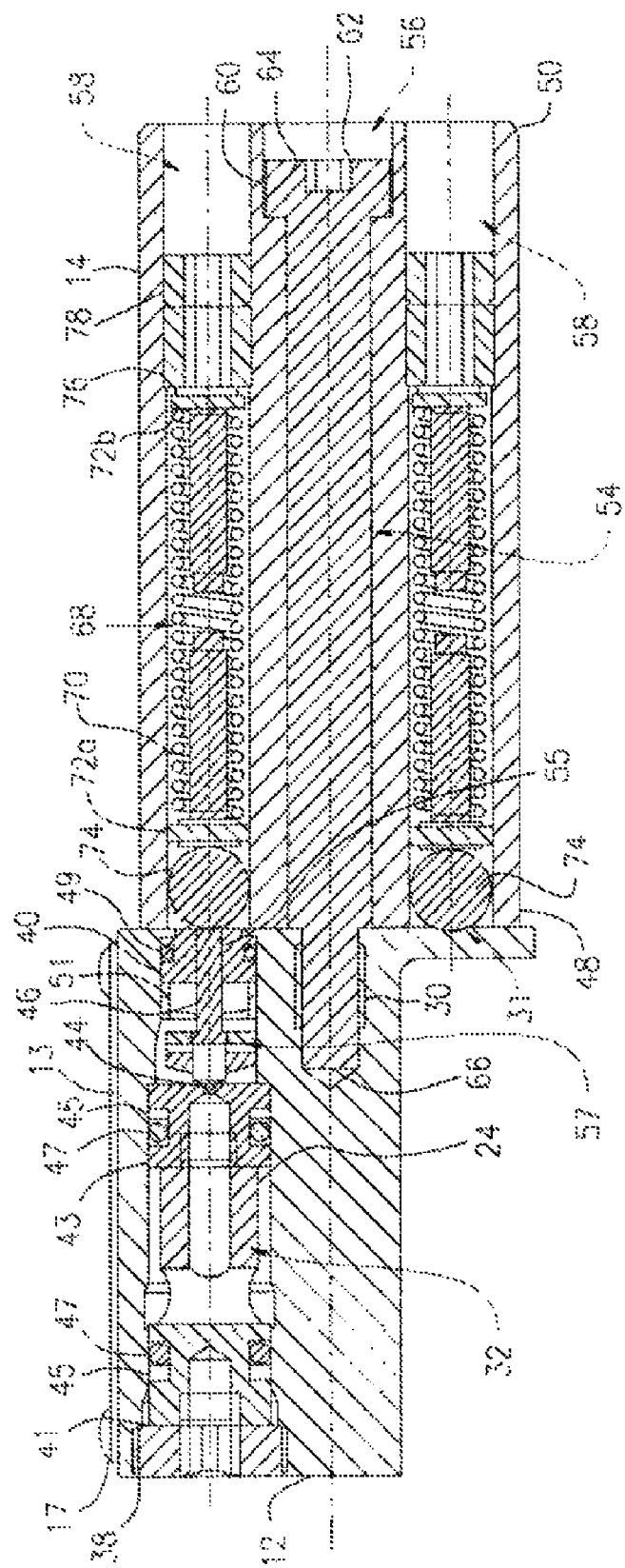
FIG. 4 is a cross-sectional view, taken along section line 4-4 and looking in the direction of the arrows, of the pressure relief valve shown in FIG. 3.

Still referring to FIGS. 4 and 5, in an embodiment, the barrel 14 includes a first end 48, a second end 50 opposite the first end 48, and an exterior surface 52 (see FIG. 5). In an embodiment, an interior portion 54 of the barrel 14 is defined by an elongated, cylindrical-shaped central chamber 56 that extends from the first end 48 to the second end 50 of the barrel 14, and a plurality of elongated, cylindrical-shaped Pouter chambers 58 that radially surrounds the central chamber 56, and each of which extends from the first end 48 to the second end 50 of the barrel 14. In an embodiment, the barrel 14 includes four of the outer chambers 58 as shown in the Figures. In other embodiments, the barrel 14 may include more or less than four of the outer chambers 58.

Still referring to FIGS. 4 and 5, in an embodiment, the barrel 14 is fastened to the manifold 12 by a shoulder screw 60, which is substantially housed within the central chamber 56 of the barrel 14. In an embodiment, one end 62 of the shoulder screw 60 includes a head 64, which is positioned proximate to and exposed from the exterior surface 52 at the second end 50 of the barrel 14, and an opposite end 66 of the shoulder screw 60 extends outwardly from the first end 48 of the barrel 14 and threadedly engages the second chamber 30 of the manifold 12. In an embodiment, the head 64 of the screw 60 is exposed and accessible external of the barrel 14 to allow a user to fasten and unfasten the screw 60 and, in turn, assemble or disassemble the barrel 14 from the manifold 12. As a result of the foregoing configuration, the manifold 12 and the barrel 14 are rotatably fastened to one another. The first end 48 of the barrel 14 is aligned with the end plate 22 of the manifold 12. In an embodiment, the barrel 14 may be locked into position by any means known in the art to prevent it from rotating relative to the manifold 12, such as, for example, a ratchet and pawl assembly (not shown in the Figures). In certain embodiments, the barrel 14 may be permitted to rotate in either or both the clockwise and counter-clockwise directions.

With reference to FIGS. 4, 5 and 7, in an embodiment, each of the outer chambers 58 houses a relief pressure adjustment assembly 68. In an embodiment, each of the assemblies 68 is identical in structure to one another. In this regard, only one of the assemblies 68 will be discussed and referenced herein. In an embodiment, the assembly 68 includes a spring 70, first and second spring guides 72a, 72b that engage the spring 70 at opposite ends thereof, and a ball 74 positioned intermediate the first spring guide 72a and the second orifice 28 of the manifold 12. In an embodiment, an adjustment screw 76 engages the second spring guide 72b and is used to adjust and preset the relief pressure load of the spring 70. In an embodiment, a lock screw 78, which is exposed at the second end 50 of the barrel 14, engages the adjustment screw 76 to retain the preset relief pressure load of the spring 70. In an embodiment, each of the springs 70 is adjusted to relief pressure loads that are different from one another. In this regard, the spring 70 puts pressure on the ball 74 and, thus, the spring 70 can be set to a unique force level of preload by the adjustment screw 76. Accordingly, in an embodiment, the pressure relief valve 10 can include multiple preset relief pressure loads, depending upon the number of the outer chambers 58 and the associated pressure adjustment assemblies 68 housed therein that are provided by the pressure relief valve 10. In an embodiment, the marking plate 13 includes indicia thereon that visually displays the pressure setting for each of the assemblies 68. Once all of the relief pressure loads have been set, the barrel 14 is rotated and indexed (i.e., cycled) by a user until the particular assembly 68 having the desired preset relief pressure load is selected. More particularly, in an embodiment, each partial turn of the barrel 14 aligns one of the assemblies 68 with the chamber 24 and, in turn, the relief valve cartridge assembly 32 housed therein. As a result, a different pressure load bears on the stem 46 of the poppet 42 by rotating the barrel 14. In an embodiment, each of the balls 74 of the remaining assemblies 68 engages a corresponding one of the detents 31 of the manifold 12 (see FIG. 4) so that the balls 74 are temporarily retained in place and, in turn, help prevent of the barrel 14 from rotating relative to the manifold 12. In addition, when the balls 74 engage the detents 31 of the manifold 12, the selected assembly 68 is aligned with the chamber 24 of the manifold. In an embodiment, the balls 74 can be released from the detents 31 by applying rotational force to the barrel 14.

Figure 8:
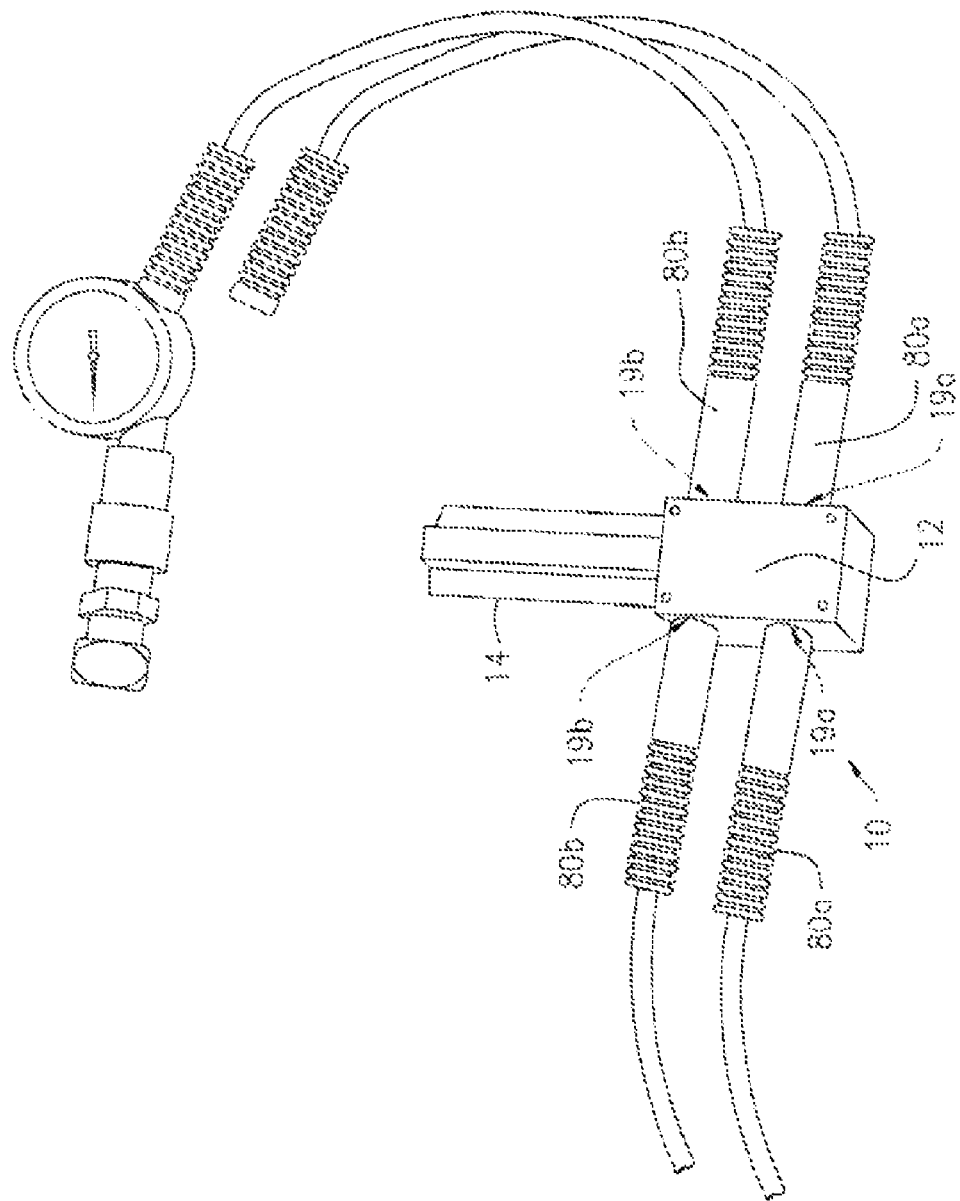
FIG. 8 is a perspective view of the pressure relief valve illustrated by FIGS. 1 through 5 in a free standing position and connected to hydraulic equipment.
Figure 9:
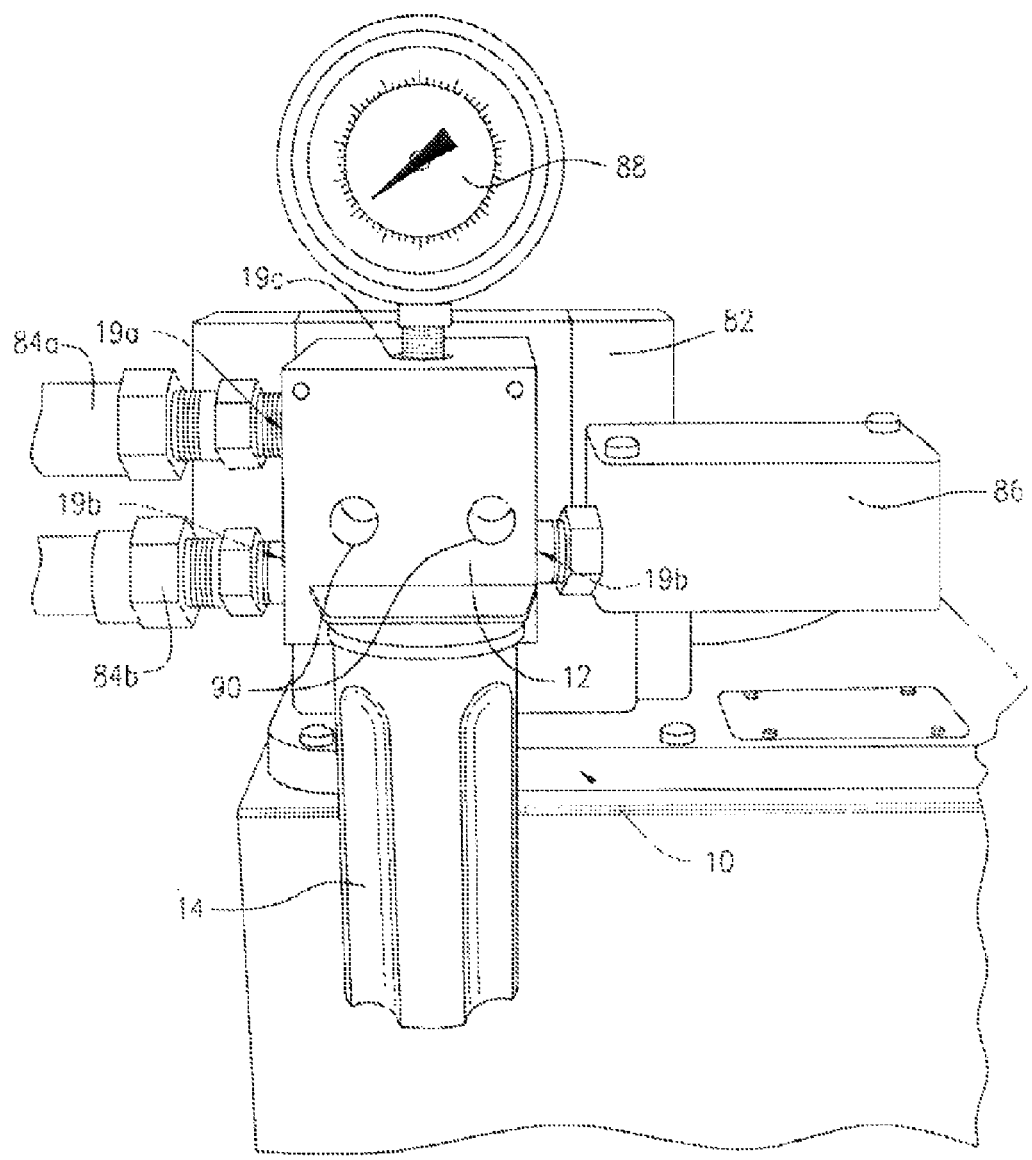
FIG. 9 is a perspective view illustrating another embodiment of the pressure relief valve shown in FIGS. 1 through 5, the pressure relief valve being shown mounted to a surface and connected to hydraulic equipment.

FIGS. 8 and 9 show embodiments of the pressure relief valve 10 attached to hydraulic equipment. In an embodiment, as shown in FIG. 9, hydraulic inlet hoses 80a are connected to the inlet ports 19a of the manifold 12, while hydraulic return hoses 80b are connected to the outlet ports 19b of the manifold 12. In the embodiment shown in FIG. 8, the pressure relief valve 10 is free standing. In an embodiment, because a user may select from multiple, preset relief pressures by rotating the barrel 14, the inlet and return hoses 80a, 80b need not be disconnected from the pressure relief valve 10, which, in turn, saves time and cost. In an embodiment, other hydraulic equipment in addition to or in lieu of the inlet and return hoses 80a, 80b may be connected to the pressure relief valve 10.

In another embodiment, as shown in FIG. 9, the pressure relief valve 10 is mounted to a surface 82 (for example, a pump assembly, as shown) via the manifold 12. In an embodiment, the pressure relief valve 10 may be mounted to the surface 82 by any suitable means known in the art, such as, for example, welding, adhesives, fasteners, etc. In an embodiment, as shown in FIG. 9, the manifold 12 includes a plurality of counterbore holes 90 formed within the exterior surface 20 thereof, which are sized and shaped to receive mounting screws (not shown in the Figures). In an embodiment shown in FIG. 9, a hydraulic inlet hose 84a is attached to one of the inlet ports 19a, while a hydraulic return hose 84b is attached to one of the outlet ports 19b. In an embodiment, a pressure switch 86 is attached to the other of the outlet ports 19b. In an embodiment, as shown in FIG. 9, the manifold 12 includes an additional port, namely, port 19c, to which a pressure gauge 88 is attached. Once again, because a user may select from multiple, preset relief pressures by rotating the barrel 14, the inlet and return hoses 84a, 84b, the switch 86 and/or the gauge 88 need not be disconnected from the pressure relief valve 10. In an embodiment, other hydraulic equipment, in addition to or in lieu of, the inlet and return hoses 84a, 84b, the switch 86, and/or the gauge 88 may be connected to the pressure relief valve 10.

In an embodiment, the manifold 12 may include any number of ports, i.e., more or less than the ports 19a through 19c. In an embodiment, each or any of the ports 19a through 19c may be threaded to threadedly engage the hydraulic equipment and any of its associated connectors. In an embodiment, any of the ports 19a through 19c that are unused may be capped or plugged (not shown in the Figures).

In an embodiment, when the pressure relief valve 10 is in use, pressure acts on the wide-angled cone 53 of the poppet check 44 within the poppet 42 (best shown in FIG. 6B) from the high pressure side 34. In turn, the poppet stem 46 slidably exits the pressurized area via a seal, and an end 55 of the poppet stem 46 communicates with the ball 74. The load on the spring 70 works on the opposite side of the poppet 42 via the ball 74 and prevents the poppet 42 from lifting off until a cracking pressure is reached. Once the cracking pressure is reached, the poppet 42 is urged in a direction toward the barrel 14 and allows hydraulic fluid to flow therethrough. The narrow, angled portion of the poppet check 44 meters the fluid flow through the relief valve cartridge assembly 32. When the flow is reversed, the port hole 57 in the poppet 42 (see FIGS. 6A B and 6B) allows reverse pressure to act on the poppet check 44 to prevent reverse flow through the seat 43. This is desirable because of the area differential which exists since the poppet stem 44 exits the pressure envelope. In an embodiment, the poppet 42 does not include the poppet check 44, so as to enable reverse flow in certain desirable applications and equipment.

In an embodiment, the pressure relief valve 10 eliminates the need for a separate check valve for return flow stoppage, since there exists the poppet check 44 within the poppet 42. In addition, in an embodiment, the poppet 42 controls multiple pressures within the same chambers. Since the pressure selection is done via the barrel 14, which is outside the pressure envelope, the need for multiple valves is eliminated. In an embodiment, the pressure relief valve 10 eliminates pulsation issues by modulating the flow through the pressure relief valve 10 by combining the needle valve with the poppet 42 function.

In an embodiment, the pressure relief valve 10 may be used for hydraulic applications and can accommodate any hydraulic fluid, such as oil. In another embodiment, the pressure relief valve 10 may be used for any other liquids or gases. In other embodiments, the pressure relief valve 10 can be used for additional suitable applications.

It will be understood that the pressure relief valve 10 described herein is merely exemplary and that a person skilled in the art may make many variations and modifications without departing from the full spirit and the scope of the embodiment described herein. For example, in an embodiment, the pressure relief valve 10 includes four preset relief pressure settings (by virtue of the embodiment of the barrel 14 including the four assemblies 68), but in other embodiments, the valve 10, and specifically the barrel 14, can be constructed to accommodate any number of the assemblies 68 and, in turn, any number of preset relief pressure settings (e.g., two, three, five, twelve, twenty-four, etc.). In an embodiment, as indicated above, the manifold 12 may include any number of ports, i.e., more or less than two of the inlet ports 19a and/or two of the outlet ports 19b. Accordingly, all such variations and modifications are intended to be included within the scope of the invention as defined in the appended claims.

What is claimed is:

1. A pressure relief valve, comprising:
a manifold having a first end, a second end opposite the first end, a first chamber extending from the first end to the second end, and a relief valve assembly housed within the first chamber; and
a barrel having a first end, a second end opposite the first end of the barrel, a plurality of chambers, each of which extends from the first end of the barrel to the second end of the barrel, and a plurality of relief pressure load assemblies, each of which is housed within a corresponding one of the plurality of chambers of the barrel, each of the relief pressure load assemblies of the barrel is adapted to be preset to a selected pressure load setting, the first end of the barrel being fastened to the second end of the manifold, whereby when the barrel is rotated relative to the manifold, one of the plurality of chambers of the barrel is moved to a selected position in which it is aligned with the first chamber of the manifold, and the other of the plurality of chambers of the barrel is moved to a deselected position in which it is not aligned with the first chamber of the manifold, and when the one of the plurality of chambers of the barrel is in its selected position, the corresponding relief pressure load assembly housed therein is aligned and within mechanical communication with the relief valve assembly of the manifold.

2. The pressure relief valve of claim 1, wherein the pressure load setting of each of the relief pressure load assemblies of the barrel is independently adjustable.

3. The pressure relief valve of claim 2, wherein the pressure load settings of the relief pressure load assemblies of the barrel are different from one another.

4. The pressure relief valve of claim 2, wherein each of the relief pressure load assemblies includes a ball, a spring engaged with the ball, and an adjustment screw for adjusting and presetting the spring with the pressure load setting.

5. The pressure relief valve of claim 4, wherein each of the relief pressure load assemblies includes a lock screw engaged with the adjustment screw of the corresponding relief pressure load assembly for retaining the pressure load setting of the spring of the corresponding relief pressure load assembly.

6. The pressure relief valve of claim 5, wherein the manifold includes an exterior surface, a first orifice positioned at the first end of the manifold, and a second orifice positioned at the second end of the manifold, each of the first and second orifices of the manifold extending from the exterior surface of the manifold to the first chamber of the manifold, the second orifice of the manifold being aligned with one of the plurality of chambers of the barrel when the one of the plurality of chambers is in its selected position.

7. The pressure relief valve of claim 6, wherein the relief valve assembly of the manifold includes a poppet having a stem that is adapted to slidably travel through the second orifice of the manifold and the aligned one of the plurality of chambers so as to engage the ball of the corresponding one of the relief pressure load assemblies of the barrel.

8. The pressure relief valve of claim 7, wherein the relief valve assembly of the manifold includes a plug and a seat positioned intermediate and in fluid communication with the plug and poppet.

9. The pressure relief valve of claim 8, wherein the poppet includes a poppet check.

10. The pressure relief valve of claim 9, wherein the poppet includes a port hole for allowing reverse pressure to act on the poppet check to prevent reverse flow through the seat.

11. The pressure relief valve of claim 8, wherein the manifold includes an end cap positioned proximate to the first orifice of the manifold for securing the plug.

12. The pressure relief valve of claim 11, wherein each of the locking screws of the relief pressure load assemblies of the barrel is positioned proximate to the second end of the barrel and are accessible externally therefrom.

13. The pressure relief valve of claim 6, wherein the manifold includes at least one inlet port extending from the exterior surface of the manifold to the first chamber of the manifold, and at least one outlet port extending from the exterior surface of the manifold to the first chamber of the manifold, each of the at least one inlet port and the at least one outlet port is adapted to receive hydraulic equipment.

14. The pressure relief valve of claim 13, wherein the manifold includes a removable cover plate for providing access to the relief valve assembly.

15. The pressure relief valve of claim 6, wherein the barrel includes a central chamber extending from the first end of the barrel to the second end of the barrel, and a fastener housed within the central chamber of the barrel for rotatably fastening the barrel to the manifold.

16. The pressure relief valve of claim 15, wherein the plurality of chambers of the barrel radially surrounds the central chamber of the barrel.

17. The pressure relief valve of claim 16, wherein the manifold includes a second chamber, whereby the fastener of the barrel engages the second chamber of the manifold.

18. The pressure relief valve of claim 17, further comprising locking means for locking the barrel so as to prevent rotation of the barrel relative to the manifold.

19. The pressure relief valve of claim 18, wherein the locking means includes at least one detent formed within the second end of the manifold, wherein when the other of the plurality of chambers is in its deselected position, the ball of the corresponding relief pressure load assembly engages the at least one detent of the manifold.

20. The pressure relief valve of claim 1, wherein the manifold is adapted to be attached to a surface.

* * * * *